(12) United States Patent
Kurian

(10) Patent No.: US 10,644,882 B2
(45) Date of Patent: May 5, 2020

(54) ELECTRONIC SECURITY KEYS FOR DATA SECURITY BASED ON QUANTUM PARTICLE STATES

(71) Applicant: Bank of America Corporation, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 140 days.

(21) Appl. No.: 15/496,436

(22) Filed: Apr. 25, 2017

(65) Prior Publication Data

US 2018/0309572 A1  Oct. 25, 2018

(51) Int. Cl.
| H04L 9/08 | (2006.01) |
| H04L 9/14 | (2006.01) |
| H04L 9/12 | (2006.01) |
| H04L 29/06 | (2006.01) |
| G06F 21/60 | (2013.01) |

(52) U.S. Cl.
CPC .......... *H04L 9/0852* (2013.01); *G06F 21/602* (2013.01); *H04L 9/12* (2013.01); *H04L 9/14* (2013.01); *H04L 63/0435* (2013.01); *H04L 2209/12* (2013.01)

(58) Field of Classification Search
CPC ..... H04L 9/0852; H04L 9/14; H04L 63/0435; H04L 2209/12; G06F 21/606
USPC ....................................................... 713/150
See application file for complete search history.

(56) References Cited

U.S. PATENT DOCUMENTS

| 6,522,749 | B2 | 2/2003 | Wang |
| 6,609,139 | B1 | 8/2003 | Dultz et al. |
| 7,178,277 | B2 | 2/2007 | Takeuchi |
| 7,577,257 | B2 | 8/2009 | Xia et al. |
| 7,590,868 | B2 | 9/2009 | Musa et al. |
| 7,627,901 | B1 * | 12/2009 | Elliott ................... H04L 9/3273 370/236 |
| 7,929,700 | B2 | 4/2011 | Lodewyck et al. |
| 8,051,283 | B2 * | 11/2011 | Lee ..................... H04L 63/0428 713/150 |
| 8,340,298 | B2 | 12/2012 | Gelfond et al. |
| 8,483,394 | B2 * | 7/2013 | Nordholt ............... H04L 9/0852 380/259 |
| 8,582,769 | B2 | 11/2013 | Zhao et al. |
| 8,639,932 | B2 | 1/2014 | Wiseman et al. |
| 8,650,401 | B2 | 2/2014 | Wiseman et al. |
| 8,693,691 | B2 | 4/2014 | Jacobs |
| 8,744,075 | B2 | 6/2014 | Tanaka |
| 8,897,449 | B1 | 11/2014 | Broadbent |
| 8,903,094 | B2 * | 12/2014 | Bovino ................. H04L 9/0852 380/278 |
| 2002/0199108 | A1 | 12/2002 | Chuang et al. |
| 2004/0078421 | A1 | 4/2004 | Routt |
| 2005/0036624 | A1 * | 2/2005 | Kent ..................... H04L 9/0858 380/277 |

(Continued)

*Primary Examiner* — Alexander Lagor
*Assistant Examiner* — Moeen Khan
(74) *Attorney, Agent, or Firm* — Michael A. Springs; Moore & Van Allen PLLC; James C. Edwards

(57) ABSTRACT

Systems and method for insuring that messages that are quantum-level encrypted are properly communicated to an intended recipient. Specifically, embodiments of the present invention provide for changing the state of a quantum particle, which corrupts the data in the message, in response to the message being tampered with during transmission.

17 Claims, 7 Drawing Sheets

(56) References Cited

U.S. PATENT DOCUMENTS

| | | | |
|---|---|---|---|
| 2006/0056630 A1 | 3/2006 | Zimmer et al. | |
| 2007/0177735 A1 | 8/2007 | Mimih et al. | |
| 2007/0234033 A1* | 10/2007 | Bade | H04L 9/12 |
| | | | 713/150 |
| 2008/0152147 A1 | 6/2008 | Xia et al. | |
| 2009/0175450 A1 | 7/2009 | Brandt | |
| 2009/0194702 A1 | 8/2009 | Meyers et al. | |
| 2014/0098955 A1* | 4/2014 | Hughes | H04K 1/02 |
| | | | 380/256 |
| 2015/0281196 A1* | 10/2015 | Sharma | H04L 63/08 |
| | | | 713/151 |
| 2015/0312260 A1* | 10/2015 | Kim | H04L 51/32 |
| | | | 713/152 |
| 2017/0324552 A1* | 11/2017 | Ahn | H04B 10/70 |
| 2019/0034661 A1* | 1/2019 | Hirose | G06F 21/6254 |

* cited by examiner

US 10,644,882 B2

ELECTRONIC SECURITY KEYS FOR DATA SECURITY BASED ON QUANTUM PARTICLE STATES

FIELD OF THE INVENTION

The present invention related to data security and, more specifically, insuring secure communication of a message that is quantum-level encrypted by changing the particle state of a quantum-level encrypted message in response to tampering with the message during communication.

BACKGROUND

Quantum computing involves theoretical computation systems that make direct use of quantum-mechanical phenomena, such as superposition and entanglement, to perform operations on data. Whereas common digital computing requires that the data be encoded into binary digits (i.e., bits), each of which is always in one of two definite states (0 or 1), quantum computation uses quantum bits, which can be in superpositions of states.

While quantum computing is a burgeoning technology, its use is foreseen to grow in the near future as a means of solving complex problems more efficiently. However, technical challenges exist in building large-scale quantum computers and, as such, quantum-capabilities are limited. Thus, in the event that an entity, such as an enterprise, corporation, university or the like has a need or will have a need in the future to implement quantum-level computing, the entity is likely to rely on third-party entities (i.e., entities external from the enterprise, corporation, university or the like) to conduct such processing of data.

However, in today's computing environment in which data is entrusted in other entities, data breaches occur at an alarming rate. A data breach is a security incident in which data, typically sensitive, protected confidential data is copied, viewed, misappropriated or otherwise used by individuals/entities other than those authorized to do so. The breaching of data may be part of multiple entities acting together (e.g., collusion or conspiracy) or implicate governments or the like (e.g., espionage). Such data breaches may be intentional (i.e., perpetuated by wrongdoers) or unintentional, but in either instance, once the data has been comprised, the harm to the data owner is unavoidable. In this regard, when an entity provides data to a third-party/external entity, the entity runs the risk that the data may be breached.

Therefore, a need exists to insure that messages that are quantum-level encrypted are properly communicated to an intended recipient. In this regard, a need exists to take necessary precautionary measures in the event that a message in improperly accessed or otherwise tampered with (e.g., intercepted, read, written, logged, stored or the like) during the transmission of the message.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for insuring that messages that are quantum-level encrypted are properly communicated to an intended recipient. Specifically, embodiments of the present invention provide for changing the state of a quantum particle in response to the message being tampered with during transmission. The changing of the state of the quantum particle used to encrypt the message, results in the data in the message being corrupted or otherwise changed (i.e., the data becomes incomprehensible or otherwise useless). Tampering may include, but is not limited to attempting to intercept or intercepting the message, attempting to read the message or reading the message, attempting to write the message or writing the message, attempting to log or logging the message, attempting to store or storing the message and the like. Once the message is received by the intended recipient, the intended recipient is unable to decrypt the message due to the fact that the particle state has changed. As a result of being unable to decrypt the message, a determination is made that the message was tampered with or an attempt was made to tamper with the message, and alerts may be sent to appropriate parties (the message sender and the intended recipient(s)) notifying such of the tampering and a need to re-send the message.

In specific embodiments of the invention, the message sender has a stand-alone quantum key generator device that is configured to generate one or more quantum encryption keys having a quantum particle state. The message recipient(s) also have a stand-alone quantum key generator device that is in synchronized communication, via a quantum communication channel, such that the synchronized communication between the devices allows for the quantum key generator device(s) in possession of the message recipient(s) to detect the quantum particle estate generated by the quantum key generator device in possession of the message sender. In response to detecting the quantum particle state, the quantum key generator device(s) in possession of the message recipient(s) to generate one or more symmetrical quantum decryption keys using the detected quantum particle state.

A system for insuring secure communication of a message that is quantum-level encrypted defines first embodiments of the invention. The system includes a first quantum key generator device having a first quantum processor that is configured to generate a quantum particle state for a quantum particle, and generate one or more quantum encryption keys using the quantum particle state for the quantum particle. The system further includes a first computing apparatus having a memory and at least one processor. The memory stores one or more encryption algorithms and the at least one processor is configured to encrypt a message using at least one of the encryption algorithms and at least one of the one or more quantum encryption keys, and initiate communication of the message to a predetermined message recipient. In response to at least an attempt to access the message during communication of the message to the predetermined recipient, the quantum particle state changes.

In further embodiments the system includes a second quantum key generator that is in possession of or controlled by the predetermined message recipient. The second quantum key generator includes at least one second quantum processor. The second quantum key generator device is in synchronized communication with the first quantum key generator via a quantum communication channel, such that, the synchronized communication provides for the second quantum key generator device to detect the generation of the quantum state by the first quantum key generator device. The second quantum processor is configured to generate one or more symmetrical quantum decryption keys using the detected quantum particle state.

In still further embodiments the system includes a second computing apparatus having a second memory and at least one second processor. The second memory stores one or more decryption algorithms and the at least one second processor is configured to decrypt the message using at least one of the decryption algorithms and the symmetrical quantum decryption key, and determine that the message has at least been attempted to be accessed based on the quantum decryption key being unable to decrypt the message as a result of the change of the quantum particle state. In related embodiments of the system, the at least one processor of the second computing apparatus is further configured to, in response to determining that the message has at least been attempted to be accessed, generate and communicate an alert to at least one of a message sender or the message recipient.

In further specific embodiments of the system, the at least attempt to access is further defined as one of (i) intercepting the message (ii) attempting to read data in the message or reading the data in the message, (iii) attempting to write data from the message or writing data from the message, (iv) attempting to log the message or logging the message, and (v) attempting to store the message or storing the message.

In still further embodiments of the system, as a response to the quantum particle state changing, data in the message changes to an incomprehensible state.

In still further embodiments of the system, the first quantum processor is further configured to generate one or more quantum encryption keys, wherein the one or more quantum encryption keys are specific to data type and/or specific to a predetermined message recipient.

In other specific embodiments of the system, the first quantum processor or the first processor is further configured to sub-divide one of the quantum encryption keys into two or more quantum encryption key parts. In such embodiments of the system the second quantum processor or the second processor is further configured to sub-divide the corresponding symmetrical quantum decryption key into a corresponding number of quantum decryption key parts. In such embodiments of the system, a predetermined quantity of the quantum encryption/decryption key parts are required to perform an action.

In still further specific embodiments of the system, the first quantum processor is further configured to generate dual or multiple quantum encryption keys and the second quantum processor is further configured to generate a corresponding symmetrical dual or multiple quantum decryption keys. In such embodiments a predetermined quantity dual or multiple quantum encryption/decryption keys are required to perform an action.

A method for insuring secure communication of a message that is quantum-level encrypted defines second embodiments of the invention. The method includes generating, by a quantum processor of a quantum key generator device, a quantum particle state for a quantum particle and generating one or more quantum encryption keys using the quantum particle state for the quantum particle. The method further includes encrypting, by a classical computing processor, a message using at least one encryption algorithm and at least one of the one or more quantum encryption keys and initiating, by a classical computing processor, communication of the message to a predetermined message recipient. In response to at least an attempt to access the message during communication of the message to the predetermined recipient, changing the quantum particle state.

In specific embodiments the method further includes in response to receipt of message by the predetermined message recipient, attempting, by a classical computing processor, to decrypt the message using at least one decryption algorithms and a symmetrical quantum decryption key, and in response to the attempt to decrypt resulting in being unable to decrypt the message, determining that the message has at least been attempted to be accessed. In further related embodiments of the method, in response to determining that the message has at least been attempted to be accessed, generate and communicate, by a classical computing processor, an alert to at least one of a message sender or the predetermined message recipient.

In further specific embodiments of the method, the at least attempt to access further comprises one of (i) intercepting the message during communication of the message to the predetermined recipient, (ii) attempting to read data in the message or reading the data in the message, (iii) attempting to write data from the message or writing data from the message, (iv) attempting to log the message or logging the message, and (v) attempting to store the message or storing the message.

In other specific embodiments the method further includes in response to changing the quantum particle state, changing data in the message to an incomprehensible state.

In still further specific embodiments of the method, generating the one or more quantum encryption keys, further included generating, by the quantum processor of the quantum key generator device, the one or more quantum encryption keys such that the keys are specific to at least one of (i) a data type, and (ii) a predetermined message recipient.

A computer program product for insuring secure communication of a message that is quantum-level encrypted defines third embodiments of the invention. The computer program product includes a non-transitory computer-readable storage medium having computer-executable instructions. The instructions cause a computer to encrypt a message using at least one encryption algorithm and at least one quantum encryption keys having a first quantum particle state; and initiate communication of the message to a predetermined message recipient. A quantum processor is configured to generate the first quantum particle state for a quantum particle, and generate one or more quantum encryption keys using the first quantum particle state. In response to at least an attempt to access the message during communication of the message to the predetermined recipient, the first quantum particle state changes to a second quantum particle state.

Thus systems, methods, and computer program products herein described in detail below provide for insuring that messages that are quantum-level encrypted are properly communicated to an intended recipient. Specifically, embodiments of the present invention provide for changing the state of a quantum particle, which corrupts the data in the message, in response to the message being tampered with during transmission.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
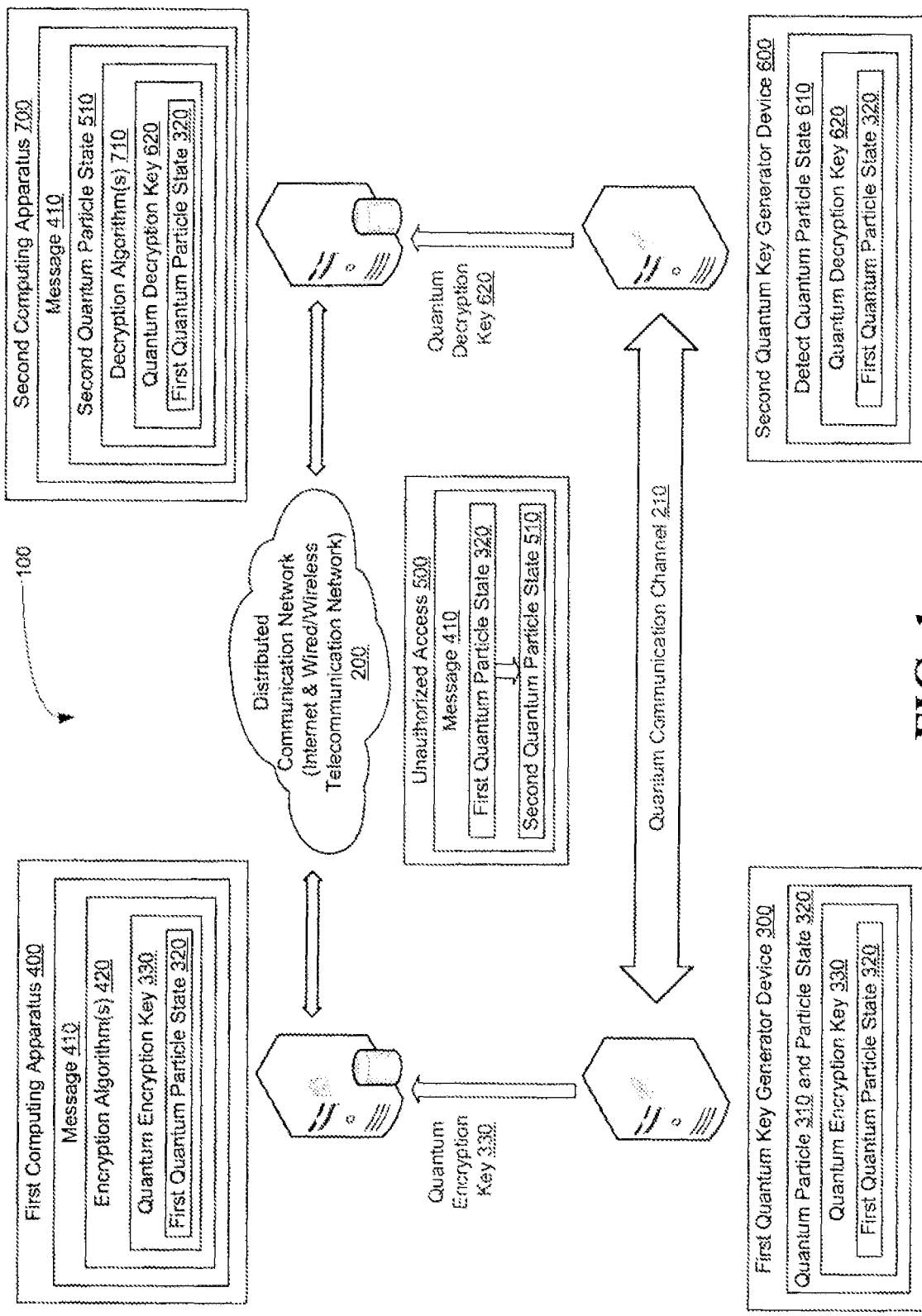
Figure 2:
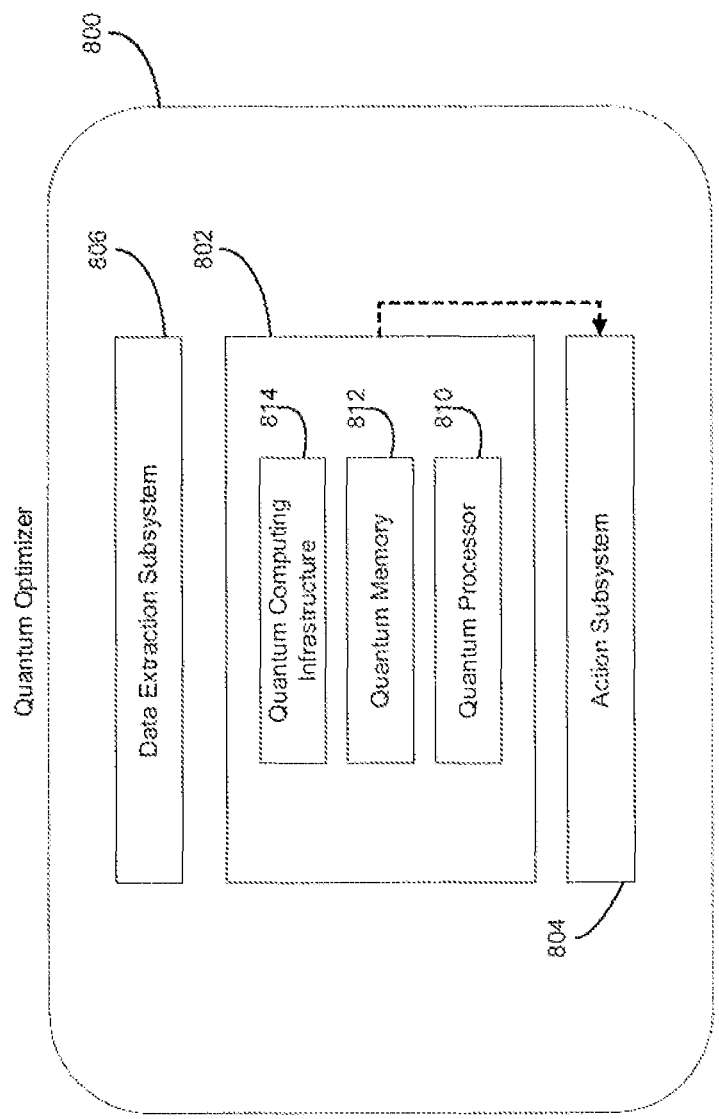
Figure 3:
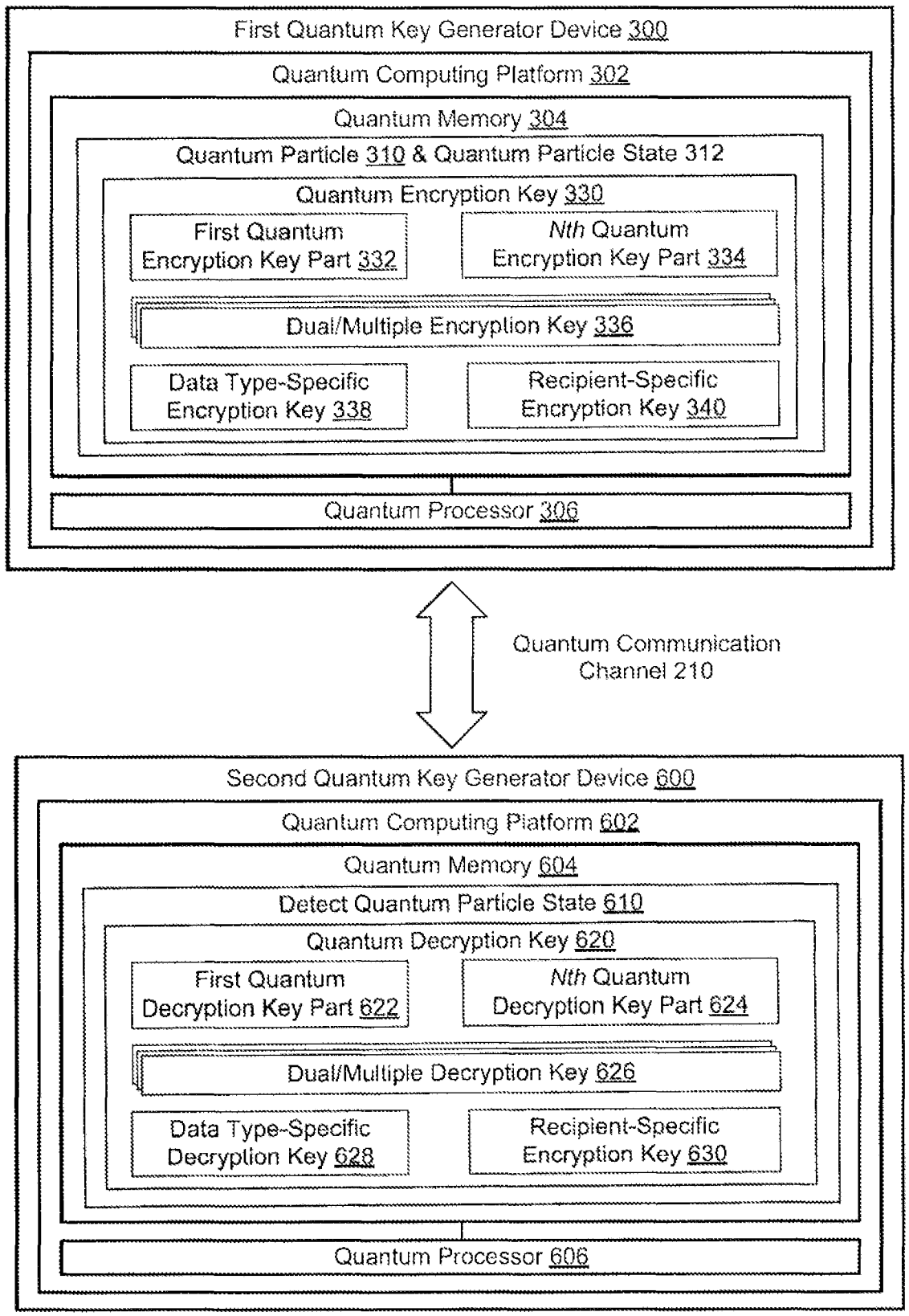
Figure 4:
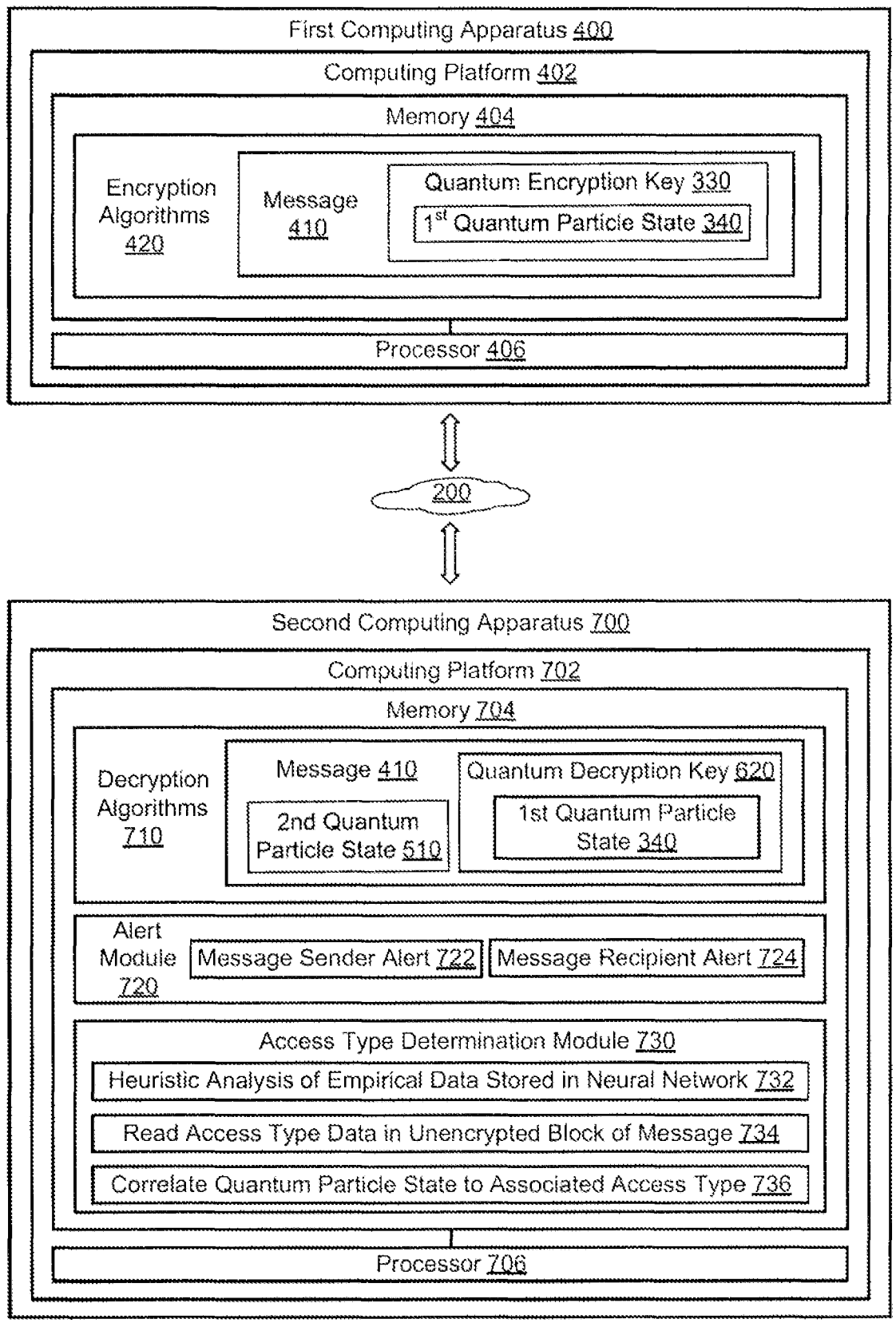
Figure 5:
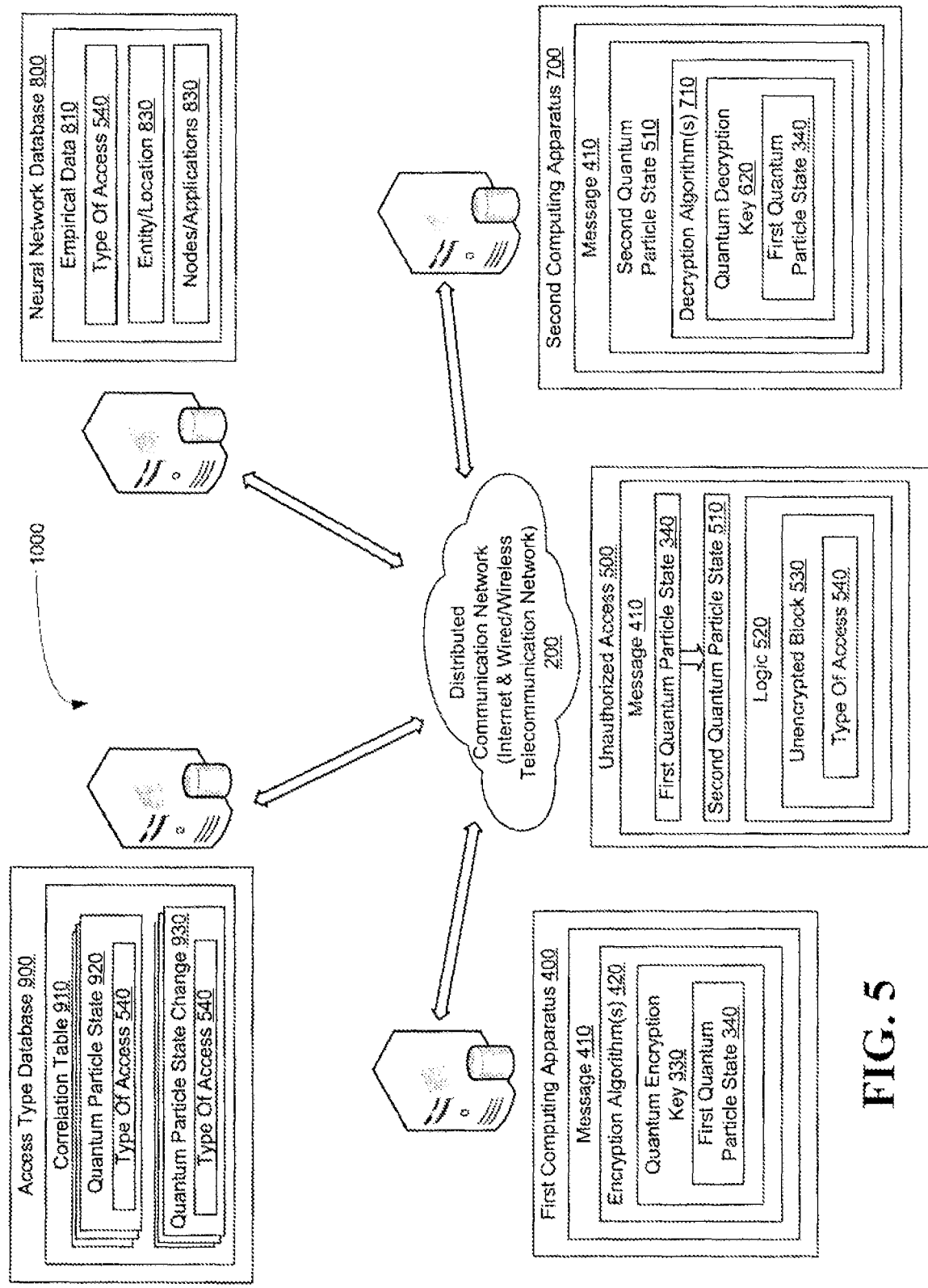
Figure 6:
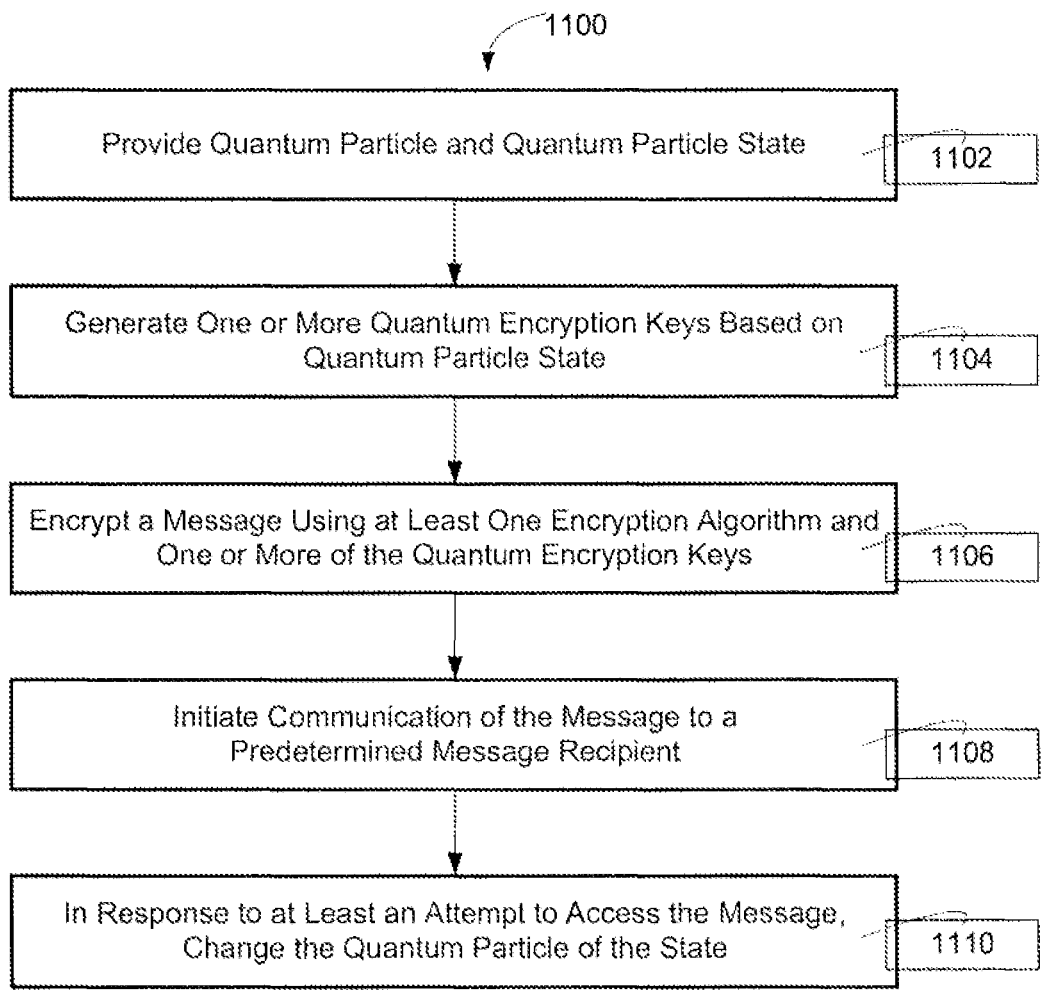
Figure 7:
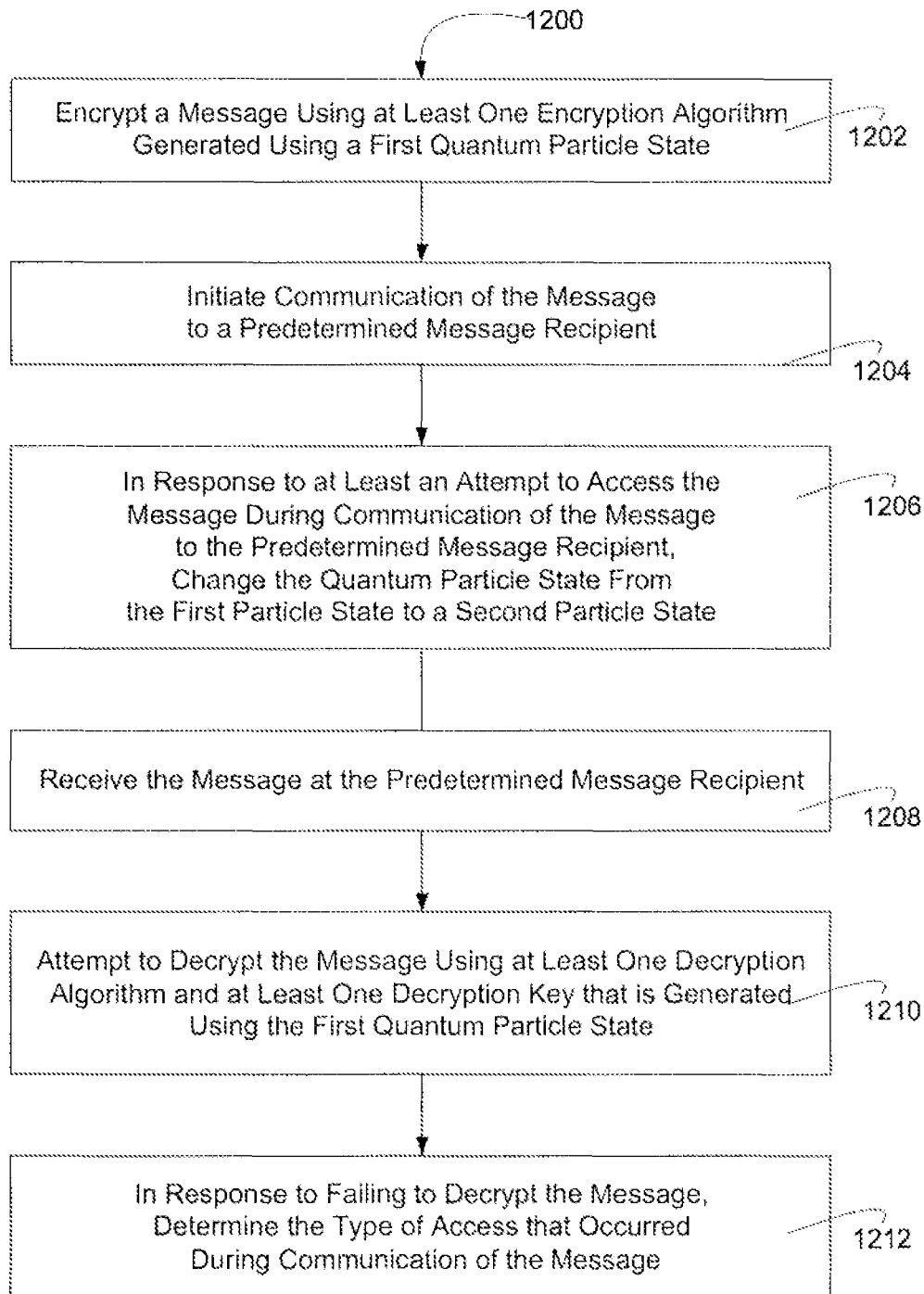

Having thus described embodiments of the invention in general terms, reference will now be made the accompanying drawings, wherein:

FIG. 1 provides a schematic diagram of an exemplary system for insuring secure communication of a quantum-level encrypted message, in accordance with embodiments of the present invention;

FIG. 2 provides a block diagram of a quantum optimizer apparatus, in accordance with embodiments of the present invention;

FIG. 3 provides a block diagram of quantum key generator devices, in accordance with embodiments of the present invention;

FIG. 4 provides a block diagram of computing apparatus configured for encrypting/decrypting quantum-level encrypted messages and determining the type of access for a message that has been tampered with/accessed during communication, in accordance with embodiments of the present invention;

FIG. 5 provides a schematic diagram of system for determining the type of access for a quantum-level encrypted message that has been tampered with/accessed during communication/transmission, in accordance with embodiments of the present invention;

FIG. 6 provides a flow diagram of a method for insuring secure communication of a quantum-level encrypted message, in accordance with embodiments of the present invention; and FIG. 7 provides a flow diagram of a method for determining the type of access for a quantum-level encrypted message that has been tampered with/accessed during communication/transmission, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, as described in more detail below, the present invention insures that messages that are quantum-level encrypted are securely communicated to an intended recipient. Specifically, embodiments of the present invention provide for changing the state of a quantum particle in response to the message being tampered with or otherwise accessed by an eavesdropper (i.e., unauthorized entity) during transmission. The changing of the state of the quantum particle used to encrypt the message, results in the data in the message being corrupted or otherwise changed (i.e., the data becomes incomprehensible or otherwise useless). Tampering may include, but is not limited to attempting to intercept or intercepting the message, attempting to read the message or reading the message, attempting to write the message or writing the message, attempting to log or logging the message, attempting to store or storing the message and the like. Once the message is received by the intended recipient, the intended recipient is unable to decrypt the message due to the fact that the particle state has changed. As a result of being unable to decrypt the message, a determination is made that the message was tampered with or an attempt was made to tamper with the message, and alerts may be sent to appropriate parties (the message sender and the intended recipient(s)) notifying such of the tampering and a need to re-send the message.

In specific embodiments of the invention, the message sender has a stand-alone quantum key generator device that is configured to generate one or more quantum encryption keys having a quantum particle state. The message recipient(s) also have a stand-alone quantum key generator device that is in synchronized communication, via a quantum communication channel, such that the synchronized communication between the devices allows for the quantum key generator device(s) in possession of the message recipient(s) to detect the quantum particle estate generated by the quantum key generator device in possession of the message sender. In response to detecting the quantum particle state, the quantum key generator device(s) in possession of the message recipient(s) to generate one or more symmetrical quantum decryption keys using the detected quantum particle state.

In other specific embodiments of the invention, the quantum key generator device is configured to parse or otherwise split a quantum encryption key into multiple segments/parts or generate dual/multiple keys. In such embodiments of the invention, the corresponding quantum key generator device that detects the quantum particle state used to generate the quantum encryption key(s) generates corresponding quantum decryption key(s) using the quantum particle state. In such embodiments a predetermined amount of keys or key parts/segments may be needed to perform a function, e.g., decrypt a message, sign a document or the like. In other specific embodiments of the invention, the quantum key generator device is configured to generate quantum encryption key(s) that are specific to data type or specific to an intended recipient.

Referring to FIG. 1, a schematic diagram is provided of a system 100 for insuring the security of quantum-level encrypted messages, in accordance with embodiments of the present invention. The system 100 insures the security by changing the quantum particle state of the message in response to at least an attempt to access or otherwise tamper with the message during communication/transmission of the message. Once the quantum particle state changes, the data in the message is corrupted (i.e., rendered incomprehensible). The system includes a first quantum key generator device 300 that implements a first quantum processor and/or optimizer (not shown in FIG. 1) to provide for a quantum particle 310 and a corresponding first quantum particle state 320 and generate at least one quantum encryption key 330 based on the first quantum particle state 320. In some embodiments of the system, the first quantum particle key generator device 300 is in synchronized communication, via quantum communication channel 210, with a second quantum key generator device 600 that is in possession of otherwise controlled to an intended message/data recipient. The quantum communication channel 210 may comprise optical fiber, free space or the like as the means for synchronized communication. The second quantum key generator device 600 implements a first quantum processor and/or optimizer (not shown in FIG. 1) that is configured to detect 610 the first quantum particle state 320 used to generate the quantum encryption key(s) 330 and generate quantum level decryption key(s) 620 using the first quantum particle state 440. In specific embodiments of the invention the synchronized quantum communication channel 210 provides for the generation of the quantum encryption key(s) 330 and the quantum decryption keys 620 substantially simultaneously (i.e., in real-time or near real-time).

The first quantum key generator 300 device and the aforementioned second quantum key generator device 600 may be configured as stand-alone devices that are configured for the sole purpose of generating quantum encryption/decryption keys. The quantum key generator devices 300 and 600 are configured to provide quantum-level computing. As used herein, a quantum key generator device is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computing apparatus implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computing apparatus: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Embodiments of the present invention make use of quantum ability of optimization by utilizing a quantum computing device in conjunction with a classical/binary computer to encrypt and decrypt messages at a quantum-level. Such a configuration enables the present invention to take advantage of quantum computing's ability to be in a superposition (i.e., quantum particle states) of different states simultaneously.

The system additionally, includes a first computing apparatus 400 that is configured to receive the quantum encryption key(s) 330 from the first quantum key generator device 300 and implement one or more encryption algorithms 420 and the quantum encryption key(s) 330 to encrypt a message 410 and initiate communication of the message to a predetermined message recipient via a distributed communication network 200, such as the Internet and/or wired/wireless telecommunication network(s) or the like.

In response to at least an attempt to access 500 the message 410 (otherwise referred to as tampering with the message 410) during the communication/transmission of the message from the message sender (i.e., the first computing apparatus 400) to the intended recipient (i.e., the second computing apparatus 700), the quantum particle state changes from the first particle state 340 to a second particle state 510. The particle state change is precipitated by the quantum encryption key 330 and/or encryption algorithms 420 that is/are configured to recognize attempts to access 500 the message during transmission/communication and trigger the change in quantum particle state. Attempts to access may include, but are not limited to (i) intercepting or attempting to intercept the message during communication, (ii) observing or attempting to observe the message during communication, (iii) reading or attempting to read the message during communication, (iv) writing or attempting to write to the message during communication, (v) logging or attempting to log the message, and/or (vi) storing or attempting to store the message. As previously discussed, the changing of the quantum particle state corrupts the data in the message, such that, the message is incomprehensible.

In some embodiments of the invention, the system 100 includes a second computing apparatus 700 that is associated with the intended massage recipient. The second computing apparatus is configured to receive the quantum decryption key(s) 620 from the second quantum key generator device 600 and implement one or more decryption algorithms 710 and the quantum decryption key(s) 620 to attempt to decrypt the message 410. In this regard, second computing apparatus 700 is configured to receive the message 410, however; since the decryption algorithm 710 uses a quantum decryption key 620 based on the first quantum particle state 440 and the message has changed to the second quantum particle step 510 (due to tampering), the decryption algorithm 710 is unable to decrypt the message. In response to the decrypt algorithm 710 being unable to decrypt the message 410 a determination is made that the message 410 has at least been attempted to be accessed (i.e., tampered with) during the communication and appropriate actions are triggered. In specific embodiments of the system, appropriate actions may include, but are not limited to, determining the type of access, the entity that accessed and/or the nodes/infrastructure associated with the access and/or generating and communicating alerts to the message sender, notifying the message sender of the unauthorized access and the need to resend the message and internal alerts to parties within the intended recipient notifying the parties of the unauthorized access.

FIG. 2 is a block diagram of an exemplary quantum optimizer 800 that can be used in parallel with a classical computer to solve optimization problems. The quantum optimizer 800 is comprised of a data extraction subsystem 806, a quantum computing subsystem 802, and an action subsystem 804. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the data extraction subsystem 806 communicates with the network to extract data for optimization, such as encryption key generation. It will be understood that any method of communication between the data extraction subsystem 806 and the network is sufficient, including but not limited to wired communication, Radiofrequency (RF) communication, BLUETOOTH WIFI®, and the like. The data extraction subsystem 806 then formats the data for optimization in the quantum computing subsystem 802.

As further depicted in FIG. 2, the quantum computing subsystem 802 comprises a quantum computing infrastructure 814, a quantum memory 812, and a quantum processor 810. The quantum computing infrastructure 814 comprises physical components for housing the quantum processor 810 and the quantum memory 810. The quantum computer infrastructure further comprises a cryogenic refrigeration system to keep the quantum computing subsystem 802 at the desired operating temperatures. In general, the quantum processor 810 is designed to perform adiabatic quantum computation and/or quantum annealing to optimize data received from the data extraction subsystem 806. The quantum memory 812 is comprised of a plurality of qubits used for storing data during operation of the quantum computing subsystem 802. In general, qubits are any two-state quantum mechanical system. It will be understood that the quantum memory 812 may be comprised of any such two-state quantum mechanical system, such as the polarization of a single photon, the spin of an electron, and the like.

The action subsystem 804 communicates the optimized data from the quantum computing subsystem 802 over the network. It will be understood that any method of communication between the data extraction subsystem 806 and the network is sufficient, including but not limited to wired communication, Radiofrequency (RF) communication, BLUETOOTH ®, WIFI®, and the like.

Referring to FIG. 3 a block diagrams are presented of first and second quantum key generator devices 300 and 600, in accordance with embodiments of the present invention. As previously discussed, first quantum key generator device 300 is in synchronized communication with the second quantum key generator device 600 via quantum communication channel 210, which may comprise an optical fiber, free space or the like. The synchronized communication channel allows for the second quantum key generator device 600 to detect the quantum particle state used by the first quantum key generator device 300 to generate the quantum encryption keys 330 (or vice versa) and simultaneously generate quantum decryption keys 620 using the same quantum particle state.

First quantum key generator 300 includes a quantum computing platform 302, such as the platform shown and described in FIG. 2. The quantum computing platform 302 includes a quantum memory 304 in communication with a quantum processor 306. The quantum processor 306 is configured to provide for a quantum particle 310 and an associated quantum particle state 312 and generate one or more quantum encryption keys 330 based on the quantum particle state 312.

Second quantum key generator 600 includes a quantum computing platform 602, such as the platform shown and described in FIG. 2. The quantum computing platform 602 includes a quantum memory 604 in communication with a quantum processor 606. The quantum processor 606 is configured to detect 610 the quantum particle state 312 used by the first quantum key generator device 300 to generate corresponding decryption keys 620 or vice versa (i.e., quantum processor 606 is configured to generate encryption keys using a quantum particle state that is detected by the quantum processor of the first quantum key generator device to generate decryption keys).

In specific embodiments of the invention, the quantum processor 306 is configured to generate a single quantum encryption key 330 and segment or otherwise split the quantum encryption key 330 into two or more parts or segments, such as, first quantum encryption key part 332 up to and including the Nth quantum key part 334. In such embodiments of the invention quantum processor 606 is configured to generate a corresponding quantum decryption key 620 based on the quantum particle state and segment or otherwise split the quantum decryption key 620 into corresponding parts or segments, such as, first quantum decryption key part 622 up to and including the Nth quantum key part 624. In such embodiments of the invention a predetermined number of the quantum key parts (commonly referred to as a quorum) may be required to perform an action. For example, a predetermined number of the quantum key decryption parts may be need to decrypt a message, electronically sign a document or the like.

In other specific embodiments of the invention, the quantum processor 306 is configured to generate dual or multiple quantum encryption keys 336. In such embodiments of the invention quantum processor 606 is configured to generate corresponding dual or multiple quantum decryption keys 626 based on the quantum particle state. In such embodiments of the invention a predetermined number of the dual or multiple encryption/decryption keys (commonly referred to as a quorum) may be required to perform an action. For example, a predetermined number of the quantum encryption or decryption keys may be need to decrypt a message, electronically sign a document or the like.

In other specific embodiments of the invention, the first and second quantum key generator devices 300 and 600 are configured to generate data type-specific quantum encryption/decryption keys 338 and 628 and/or recipient-specific quantum encryption/decryption keys 340 and 630. Data type-specific quantum encryption/decryption keys are limited in use to quantum encrypting and decrypting of the associated data type. For example, one quantum encryption/decryption keys may be designated for encrypting/decrypting transaction data and another quantum encryption/decryption keys may be designated for encrypting/decrypting text data and the like. Recipient-specific quantum encryption/decryption keys are limited in use to quantum encrypting and decrypting messages/data for the associated specific recipient. For example, one quantum encryption/decryption key may be designated for a first recipient and another quantum encryption/decryption key may be designated for second recipient and the like. In this regard, the first and/or second quantum key generator devices 300 and 600 may not be in a 1:1 relationship with each other, but, rather may be in synchronized quantum communication with multiple quantum key generator devices. In addition, the first and second quantum key generator devices 300 and 600 may be configured to generate quantum encryption/decryption keys that are both data type specific and recipient specific.

Referring to FIG. 4, block diagrams are shown of first and second computing apparatus 400 and 700 configured for encrypting and decrypting quantum-level encrypted messages and performing other functions in accordance with embodiments of the present invention. The apparatus 400 and 700 may include one or more of any type of computing device, such as one or more servers, personal computers or the like. The present systems, methods and computer program products can accordingly be performed and/or implemented on any form of one or more computing devices.

The apparatus 400 and 700 includes a computing platform 402 and 702 that can receive and execute algorithms, such as models, routines, and applications. Computing platform 402 and 702 includes corresponding memory 404 and 704, which may comprise volatile and non-volatile memory, such as read-only and/or random-access memory (RAM and ROM), EPROM, EEPROM, flash cards, or any memory common to computer platforms. Further, memory 404 and 704 may include one or more flash memory cells, or may be any secondary or tertiary storage device, such as magnetic media, optical media, tape, or soft or hard disk. Moreover, memory 404 and 704 may comprise cloud storage, such as provided by a cloud storage service and/or a cloud connection service.

Further, computing platform 402 and 702 also includes one or more conventional or classical processors 406 and 706, which may be an application-specific integrated circuit ("ASIC"), or other chipset, processor, logic circuit, or other data processing device. Processors 406 and 706 or other processor such as ASIC may execute an application programming interface ("API") (not shown in FIG. 4) that interfaces with any resident programs, such as encryption/decryption algorithms 420 and 701, alert module 720 and access type determination module 730 and routines, sub-modules associated therewith or the like stored in the memory 404 and 704 of the apparatus 400 and 700.

Processor 406 and 706 includes various processing subsystems (not shown in FIG. 4) embodied in hardware, firmware, software, and combinations thereof, that enable the functionality of the apparatus 400 and 700 and the operability of the apparatus 400 and 700 on a network, such as distributed computing network 200. For example, processing subsystems allow for initiating and maintaining communications and exchanging data with other networked devices shown in FIG. 1 and FIG. 5. For the disclosed aspects, processing subsystems of processor 406 and 706 may include any subsystem used in conjunction with encryption/decryption algorithms 420 and 701, alert module 720 and access type determination module 730 and related algorithms, sub-algorithms, modules, sub-modules thereof.

Computer platform 402 and 702 may additionally include communications module (not shown in FIG. 4) embodied in hardware, firmware, software, and combinations thereof, that enables communications among the various components of the apparatus 400 and 700, as well as between the other networked devices. Thus, communication module may include the requisite hardware, firmware, software and/or combinations thereof for establishing and maintaining a network communication connection and initiating communication of and receiving quantum-level encrypted messages 410.

In specific embodiments of the apparatus 400, the memory 404 stores one or more encryption algorithms 420 that are configured to encrypt message 410 using the one or more quantum encryption keys 330 generated using the first quantum particle state 340.

Further, the memory 707 of apparatus 700 stored one or more corresponding decryption algorithms 710 that are configured to attempt to decrypt message 410 using the one or more quantum decryption keys 620 generated using the first quantum particle state 340. In accordance with embodiments of the present invention, in which the quantum state of the quantum-level encrypted message 410 has changed from the first quantum particle state 340 to the second quantum particle state 510 due to tampering/unauthorized access during the communication/transmission, the decryption algorithm(s) 710 is prevented from decrypting the message.

As such, according to specific embodiments of the invention, the memory 704 of second computing apparatus 700 stores alert module 720 that is configured to, in response to determining that a message 410 cannot be decrypted and/or that the quantum particle state has changed, generate and initiate communication of an alert. The alert may take the form of a message sender alert 722 that notifies the message sender of (i) the inability to decrypt the message and/or (ii) the unauthorized access of the message during communication and, in some embodiments, requests that the message sender resend the message. In other embodiments, the alert may take the form of an internal message recipient alert sent to one or more internal entities, to notify the internal message recipient entities (i) that the message was unable to be decrypted and/or (ii) the unauthorized access of the message during communication.

In other embodiments of the invention, the memory 704 of second computing apparatus 700 stores access type determination module 730 that is configured to determine the type of unauthorized access or tampering undergone by the message 410 during communication/transmission. As previously discussed accede type may include, but is not limited to, (i) intercepting or attempting to intercept the message during communication, (ii) observing or attempting to observe the message during communication, (iii) reading or attempting to read the message during communication, (iv) writing or attempting to write to the message during communication, (v) logging or attempting to log the message, and/or (vi) storing or attempting to store the message. In specific embodiments of the invention, the determination of access type is conducted by heuristic analysis 732 of empirical data stored in a neural network database. In such embodiments of the invention the change in quantum particle state (from the first quantum particle state to the second quantum particle state) associated with the message is compared to historical data associated with previous messages that experienced changes in quantum particle states and have an identified access type. In other specific embodiments of the invention, in which the message is logically programmed to capture access type data in an unencrypted block of the message, the determination of access type comprises reading 734 the access type data from the unencrypted block of the message. In still further specific embodiments of the invention, in which quantum particle states are associated with specific access types, determination of the access type provides for correlating 736 the quantum particle state to the previously associated access type.

Referring to FIG. 5 a schematic diagram is presented of a system 1000, for determining access type for a quantum-level encrypted message that has been accessed/tampered with during communication/transmission, in accordance with embodiments of the present invention. The system includes a first computing apparatus 400 that is configured to receive the quantum encryption key(s) 330 from the first quantum key generator device 300 (shown in FIG. 1) and implement one or more encryption algorithms 420 and the quantum encryption key(s) 330 based on the first quantum particle state 340 to encrypt a message 410 and initiate communication of the message to a predetermined message recipient via a distributed communication network 200, such as the Internet and/or wired/wireless telecommunication network(s) or the like. The system additionally includes a second computing apparatus 700 in possession or control of the intended recipient that is configured to receive the message 410 and attempt to decrypt the message using one or more corresponding decryption algorithms 710 and quantum decryption keys 620 based on the first quantum particle state 340.

In the event that the message is accessed 500 or otherwise tampered with during the communication/transmission of the message from the first computing apparatus 400 to the second computing apparatus 700, the quantum encrypted message 410 is configured to change quantum particle state, i.e., change from a first particle state 340 to a second particle state 510. As a result of the quantum particle state change, the decryption algorithm(s) 710 are unable to decrypt the message. In response to being unable to decrypt the message, the second computing apparatus 700 is configured to determine the type of access that the message 410 experienced during transmission.

In specific embodiments of the system 1000, the message 410 may include logic 520 that is configured to record, in an unencrypted block 530 of the message, data associated with the type of access 540. In this regard, the logic may record all of the actions undergone by the message during communication or, in other embodiments, record only the unforeseen (i.e., unauthorized) actions undergone by the message 410. In such embodiments of the invention, determination of the access type comprises reading the data in the unencrypted block of the data to determine the access type. In those embodiments in which the logic 510 is configured to record all actions encountered by the message during transmission, the determination of access type may involve determining which actions were authorized and which actions were associated with unauthorized access/tampering.

In other specific embodiments of the invention, the quantum particle states or the changes in quantum particle state may be associated with a corresponding type or types of access. For example, if a message changes to a specific quantum particle state or if the message changes from one specific quantum particle state to another specific quantum particle state, the specific quantum particle state or the specific change in quantum particle state may be correlated to a specific access type or access types (i.e., a pattern of two or more access types). In such embodiments of the invention the determination of access type may include accessing an access type database 900 that stores a correlation table 910 that correlates quantum particle states 920 or quantum particle state changes 930 to type of access 540 or multiple types of access 540.

In still further embodiments of the invention, determination of the access type may provide for accessing a neural network database 800 to analyze empirical data 810 associated with previous messages that were found to be accessed/tampered with and have an identified access type or access type(s). In this regard, analyzing the empirical data 810 entails comparing the quantum particle state or the quantum particle state change in the current message to quantum particle states or quantum particle state changes in the previous messages to determine similarities and/or patterns so as to heuristically determine, to a reasonable level of certainty, what type of access or types of access occurred in the current message. In addition to determining the type of access, heuristic analysis of the empirical data may also provide for determining the entity and/or location 830 of the unauthorized access and/or the types of nodes/hardware or types of applications/operating systems/software 840 associated with the unauthorized access/tampering.

Referring to FIG. 6 a flow diagram is depicted of a method 110 for insuring secure communication of a quantum-level encrypted message, in accordance with embodiments of the present invention. At Event 1102, a quantum particle and corresponding quantum particle state are provided for. At Event 1004, one or more quantum encryption keys are generated based on the quantum particle state. The quantum encryption keys are configured such that the quantum particle state of a message encrypted with the keys will change quantum particle state in response to the message being accessed or tampered with during communication of the message. In specific embodiments of the invention, dual or multiple quantum encryption keys are generated. In other specific embodiments of the invention, a single quantum encryption key is generated and subsequently partitioned or split into two or more quantum encryption key segments or parts. In further specific embodiments of the invention, the quantum encryption keys may be data specific and/or recipient specific.

At Event 1106, a message is encrypted using at least one encryption algorithm and one or more of the quantum encryption keys and, at Event 1108, communication of the message to an intended recipient is initiated.

At Event 1110, in response to at least an attempt to access (i.e., observe, read, write, log, store or the like) the message during communication of the message, the quantum particle state of the encrypted message is changed. In response to the change in quantum particle state, the message is corrupted (i.e., the contents of the message are rendered incomprehensible).

Referring to FIG. 7 a flow diagram is depicted of a method 1200 for determining the type of unauthorized access experiences by a quantum-level encrypted message during communication/transmission, in accordance with embodiments of the present invention. At Event 1202, a message is encrypted using at least one encryption algorithm generating using an encryption key based on a first quantum particle state and, at Event 1204, communication of the message is initiated to a predetermined message recipient.

At Event 1206, in response to at least an attempt to access the message during communication of the message to the predetermined message recipient, the quantum particle state of the quantum encrypted message changes from the first particle state to a second particle state. The change in quantum particle states corrupts the message, rendering the message incomprehensible.

At Event 1208, the message is received by the intended recipient and, at Event 1210, an attempt to decrypt the message is made using the at least one decryption algorithm and at least one quantum decryption key that was generated using the first quantum particle state. At Event 1212, in response to failing to decrypt the message, one or more types of access are determined for the message. The type(s) of access denoting what type of tampering occurred during transmission.

Thus, systems, apparatus, methods, and computer program products described above provide for insuring that messages that are quantum-level encrypted are properly communicated to an intended recipient. Specifically, embodiments of the present invention provide for changing the state of a quantum particle, which corrupts the data in the message, in response to the message being tampered with during transmission.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for insuring secure communication of a message that is quantum-level encrypted, the system comprising:
   a first quantum key generator device having a first quantum processor configured to:
     generate a quantum particle state for a quantum particle, and
     generate one or more quantum encryption keys using the quantum particle state for the quantum particle, wherein the quantum encryption keys are generated to be specific to (i) a data type being communicated in the message and (ii) a predetermined message recipient, wherein the quantum encryption keys are limited to use in encrypting data of the data type and for the predetermined message recipient, wherein the first quantum processor is further configured to subdivide one of the one or more quantum encryption keys into two or more quantum encryption keys; and
   a first computing apparatus having a memory and at least one processor, wherein the memory stores one or more encryption algorithms and wherein the at least one processor is configured to:
   encrypt a message using at least one of the one or more encryption algorithms and at least one of the one or more quantum encryption keys, and
     initiate communication of the message to the predetermined message recipient, wherein in response to at least an attempt to access the message during communication of the message to the predetermined message recipient, (i) the quantum particle state changes, and (ii) logical programming in the message is invoked to record access type identifying data in an unencrypted block of the message, wherein the access type identifying data includes unauthorized actions undergone by the message during communication and is used to determine a type of access that at least was attempted during communication of the message to the predetermined message recipient.

2. The system of claim 1, further comprising a second quantum key generator device controlled by the predetermined message recipient and having at least one second quantum processor, wherein the second quantum key generator device is in synchronized communication with the first quantum key generator device via a quantum communication channel, wherein the synchronized communication provides for the second quantum key generator device to detect the generation of the quantum particle state by the first quantum key generator device and wherein the second quantum processor is configured to generate one or more symmetrical quantum decryption keys using the detected quantum particle state.

3. The system of claim 2, further comprising a second computing apparatus having a second memory and at least one second processor, wherein the second memory stores one or more decryption algorithms and wherein the at least one second processor is configured to:
  decrypt the message using at least one of the one or more decryption algorithms and at least one of the one or more symmetrical quantum decryption keys, and
  determine that the message has at least been attempted to be accessed based on the at least one of the one or more symmetrical quantum decryption keys being unable to decrypt the message as a result of the change of the quantum particle state.

4. The system of claim 3, wherein the at least one second processor of the second computing apparatus is further configured to, in response to determining that the message has at least been attempted to be accessed, generate and communicate an alert to at least one of a message sender or the predetermined message recipient.

5. The system of claim 1, wherein the at least attempt to access further comprises intercepting the message during communication of the message to the predetermined message recipient.

6. The system of claim 1, wherein the at least attempt to access further comprises one of (i) attempting to read data in the message or reading data in the message, (ii) attempting to write data from the message or writing data from the message, (iii) attempting to log the message or logging the message, and (iv) attempting to store the message or storing the message.

7. The system of claim 1, wherein, as a response to the quantum particle state changing, data in the message changes to an incomprehensible state.

8. The system of claim 2, wherein the second quantum processor is further configured to sub-divide a corresponding symmetrical quantum decryption key into a corresponding number of quantum decryption key parts, wherein a predetermined quantity of the quantum decryption key parts are required to perform an action.

9. The system of claim 2, wherein first quantum processor is further configured to generate a plurality of quantum encryption keys wherein the second quantum processor is further configured to generate a corresponding plurality of symmetrical quantum decryption keys, wherein a predetermined quantity of the plurality of symmetrical quantum decryption keys are required to perform an action.

10. A method for insuring secure communication of a message that is quantum-level encrypted, the method comprising:
  generating, by a quantum processor of a quantum key generator device, a quantum particle state for a quantum particle;
  generating, by the quantum processor of the quantum key generator device, one or more quantum encryption keys using the quantum particle state for the quantum particle, wherein the quantum encryption keys are generated to be specific to (i) a data type being communicated in the message and (ii) a predetermined message recipient, wherein the quantum encryption keys are limited to use in encrypting data of the data type and for the predetermined message recipient and wherein the one or more quantum encryption keys are sub-divided into two or more quantum encryption keys;
  encrypting, by a classical computing processor, a message using at least one encryption algorithm and at least one of the one or more quantum encryption keys;
  initiating, by a classical computing processor, communication of the message to the predetermined message recipient; and
  in response to at least an attempt to access the message during communication of the message to the predetermined message recipient, (i) changing the quantum particle state, and (ii) invoke logical programming in the message to record access type identifying data in an unencrypted block of the message, wherein the access type identifying data includes unauthorized actions undergone by the message during communication and is used to determine a type of access that at least was attempted during communication of the message to the predetermined message recipient.

11. The method of claim 10, further comprising:
  in response to receipt of the message by the predetermined message recipient, attempting, by a classical computing processor, to decrypt the message using at least one decryption algorithms and a symmetrical quantum decryption key; and
  in response to the attempt to decrypt resulting in being unable to decrypt the message, determining that the message has at least been attempted to be accessed.

12. The method of claim 11, further comprising in response to determining that the message has at least been attempted to be accessed, generate and communicate, by a classical computing processor, an alert to at least one of a message sender or the predetermined message recipient.

13. The method of claim 10, wherein the at least attempt to access further comprises one of (i) intercepting the message during communication of the message to the predetermined message recipient, (ii) attempting to read data in the message or reading data in the message, (iii) attempting to write data from the message or writing data from the message, (iv) attempting to log the message or logging the message, and (v) attempting to store the message or storing the message.

14. The method of claim 10, further comprising in response to changing the quantum particle state, changing data in the message to an incomprehensible state.

15. A computer program product for insuring secure communication of a message that is quantum-level encrypted, comprising a non-transitory computer-readable storage medium having computer-executable instructions for causing a computer to:
  in response to generating a quantum particle state for a quantum particle, generate one or more quantum encryption keys using the first quantum particle state, wherein the quantum encryption keys are generated to be specific to (i) a data type being communicated in the message and (ii) a predetermined message recipient, wherein the quantum encryption keys are limited to use in encrypting data of the data type and for the predetermined message recipient and wherein the one or more quantum encryption keys are sub-divided into two or more quantum encryption keys;
  encrypt a message using at least one encryption algorithm and at least one of the one or more quantum encryption keys having a first quantum particle state; and
  initiate communication of the message to the predetermined message recipient,
  wherein in response to at least an attempt to access the message during communication of the message to the predetermined message recipient, (i) the first quantum particle state changes to a second quantum particle state, and (ii) logical programming in the message is invoked to record access type identifying data in an unencrypted block of the message, wherein the access type identifying data includes unauthorized actions undergone by the message during communication and is used to determine a type of access that at least was attempted during communication of the message to the predetermined message recipient.

16. The computer program product of claim 15, wherein in response to at least an attempt to access further comprises one of (i) intercepting the message during communication of the message to the predetermined message recipient, (ii) attempting to read data in the message or reading data in the message, (iii) attempting to write data from the message or writing data from the message, (iv) attempting to log the message or logging the message, and (v) attempting to store the message or storing the message.

17. The computer program product of claim 16, wherein in response to changing from the first quantum particle state to the second quantum particle state, data in the message is changed to an incomprehensible state.

* * * * *